United States Patent
Poisson

[11] Patent Number: 5,825,544
[45] Date of Patent: Oct. 20, 1998

[54] ROAD SURFACE LIGHT REFLECTOR

[76] Inventor: Réjean Poisson, 766, route 117 est, Lac des Écorces, Québec, Canada, J0W 1H0

[21] Appl. No.: 837,292

[22] Filed: Apr. 11, 1997

[51] Int. Cl.⁶ ....................................................... G02B 5/12
[52] U.S. Cl. .............................. 359/551; 359/515; 404/14
[58] Field of Search ..................................... 359/515, 527, 359/531, 532, 534, 536–540, 542, 546, 547, 548, 551; 404/9, 11, 12, 14, 16; 116/63 R, 63 P

[56] References Cited

U.S. PATENT DOCUMENTS

| | | | |
|---|---|---|---|
| 2,865,266 | 12/1958 | Wynn | 359/551 |
| 3,782,843 | 1/1974 | Eigenmann | 359/551 |
| 4,284,365 | 8/1981 | Rabinow | 359/551 |
| 4,659,248 | 4/1987 | Flanagan | 359/551 |

Primary Examiner—James Phan
Attorney, Agent, or Firm—Francois Martineau

[57] ABSTRACT

A road surface light reflector is provided for use in complementary recesses in roads, to indicate the position of centerlines or sidelines on roads in a nocturnal environment by reflecting the light emitted by the headlights of incoming vehicles. The reflector has a discoid main body which is destined to be embedded into a road hole, so as to form a flat exposed top surface therewith, thus not protruding above the road level. The reflector main body is made of rubber, and its top portion comprises small glass particles embedded therein and covering the reflector exposed top surface, for providing a reflective exposed top surface. An alternate embodiment provides glass particles mixed throughout the whole depth of the rubber main body. The rubber main body is fixedly anchored inside its hole through the instrumentality of glue. The reflector according to the invention thus has a low production cost and can be used on roads that are likely to be snow plowed, since it does not protrude above the road level.

12 Claims, 1 Drawing Sheet

ROAD SURFACE LIGHT REFLECTOR

FIELD OF THE INVENTION

The invention relates to road surface light reflectors, and more particularly to road surface light reflectors for use on roads on which snow plowing is accomplished.

BACKGROUND OF THE INVENTION

It is known to use road surface light reflectors on roads, instead of or in combination with the conventional painted lines, so that the side edges and centerline of the road be more clearly visible at night due to the reflection of the light of the vehicles headlights on these reflectors.

However, these road surface light reflectors are prone to be damaged, removed or broken, especially when they are used on roads which receive a significant quantity of snow, for road graders or snow plows will then scrape the road surface with their snow-removing blade-like devices. Indeed, these road reflectors are often fixedly attached on the top of the road surface, and thus protrude over it. The snow plow or road grader is very likely to hit and remove the light reflector with its snow-removing implement, thus effectively removing the road lines nocturnal indications, often where no other means therefor are provided.

A partial solution to this problem has been provided in Canadian patent No. 1,248,504 issued in 1989 to G. S. Jefferies. This patent discloses a road marker comprising a cylindrical main body which is to be inserted into a complementary hole in the road. The road marker further comprises an upwardly convex head portion which protrudes above the road surface level. This head surface is grooved and has a light reflective device fixedly attached inside the groove. The snow plow or road grader which scrapes the road surface would apparently ride up and over the marker head without damaging it. The road marker is said to be made of cast iron or other suitable material, e.g. a sheet of heavy gauge metallic material formed into the marker apparatus of the Jefferies patent.

Although such a device would probably be operational on a perfectly flat and smooth road surface, it would probably be prone to breakage on slightly uneven road surfaces. The winter and spring seasons have a tendency to fissure and roughen a road surface due to the important temperature differentials that induce thermal expansion stresses in the road material (concrete) per se and to the water seeping through small cracks and holes in the material, the water having an important volumic increase when it freezes and consequently fissuring the road surface significantly. Thus, roads submitted to temperatures which vary below and above the freezing point are very likely to fissure and obtain an uneven surface. The diametrally larger head portion of the Jefferies marker apparatus could thus well be vertically spaced over the road surface due to road imperfections developped through the thermal expansion stresses it has endured over time. The scraping implement of the road grader or snow plow, very often frontwardly concave so as to have its scraping leading edge substantially tangential with the road surface, could thus have free access between the marker head portion and the road surface, thus possibly breaking or removing the marker from its destined position.

Thus, it is the present applicant's opinion that marker devices that vertically protrude beyond the road surfaces are prone to being damaged or removed by the snow removing vehicles, even one as in the Jefferies patent which is designed to prevent such a situation from occuring.

Another problem with the Jefferies device is the iron or otherwise metallic material used to make the marker apparatus. It can be seen that such a material would be prone to corrosion over time, and thus could break. Its reflective head could be consequently removed from its main body solely by the heavy motorized vehicles rolling thereover.

The reflective members generally used are made of a plurality of small plastic surfaces that are oriented in many directions, so as to reflect the light directed all the way around it. Although these reflectors are rather conventional, the production cost at very large scale, for use as road markers, becomes important.

OBJECTS OF THE INVENTION

It is an object of this invention to provide a road surface light reflector that would not be prone to be damaged or removed, more specifically by the snow-removing vehicles, while being effectively reflective to headlights directed thereon by incoming motor vehicles.

It is another object of this invention that the road reflector be of low production cost.

SUMMARY OF THE INVENTION

The invention relates to road surface light reflectors, and more particularly to road surface light reflectors for use on roads on which snow plowing is accomplished.

More particularly, the present invention is a road surface light reflector to be fixedly anchored into a complementary recess on the surface of a motorway road, said light reflector having a main body destined to be entirely and snugly embedded inside the road recess and defining an upper portion having a substantially flat top exposed surface destined to face upwardly so as to be apparent through the road recess and to be substantially at the same level as the road surface, said light reflector main body being made of a polymeric material having a low thermal expansion coefficient and having a granular, reflective material included into at least a top layer of said light reflector main body, wherein a small fraction of said reflective, granular material becomes exposed on said exposed top surface and thus a light reflective top surface is created to reflect the headlight beams of incoming vehicles on the road while said light reflector does not protrude above the road top surface.

Preferably, said polymeric material is rubber and said granular material is fragmented glass particles.

Advantageously, the granularity of said fragmented glass particles is inferior to 841 $\mu$m, and preferably mostly included in the 297 $\mu$m to 595 $\mu$m range.

Preferably, said main body has a substantially discoid shape, thus further defining a cylindrical, peripheral side wall and a substantially flat lower surface.

Preferably, the road surface light reflector of the invention further comprises attachment means provided at least at one of said main body peripheral side wall and lower surface, for a fixed engagement in the road recess with the road material.

Advantageously, said attachment means is glue spread over said main body peripheral wall and lower surface for adhesive contact with the surrounding road material.

Preferably, said main body has a diameter of approximately ten centimeters and a thickness of approximately two centimeters, said top layer of said main body containing said granular reflective material being approximately four millimeters thick.

Alternately, said granular material can be mixed with said polymeric material throughout layers along the full depth of the entire reflector main body. The fragmented glass then would preferably occupy 20% to 35% of the reflector main body volume.

DESCRIPTION OF THE DRAWINGS

In the single annexed sheet of drawings.

DETAILED DESCRIPTION OF THE EMBODIMENTS

Figure 1:
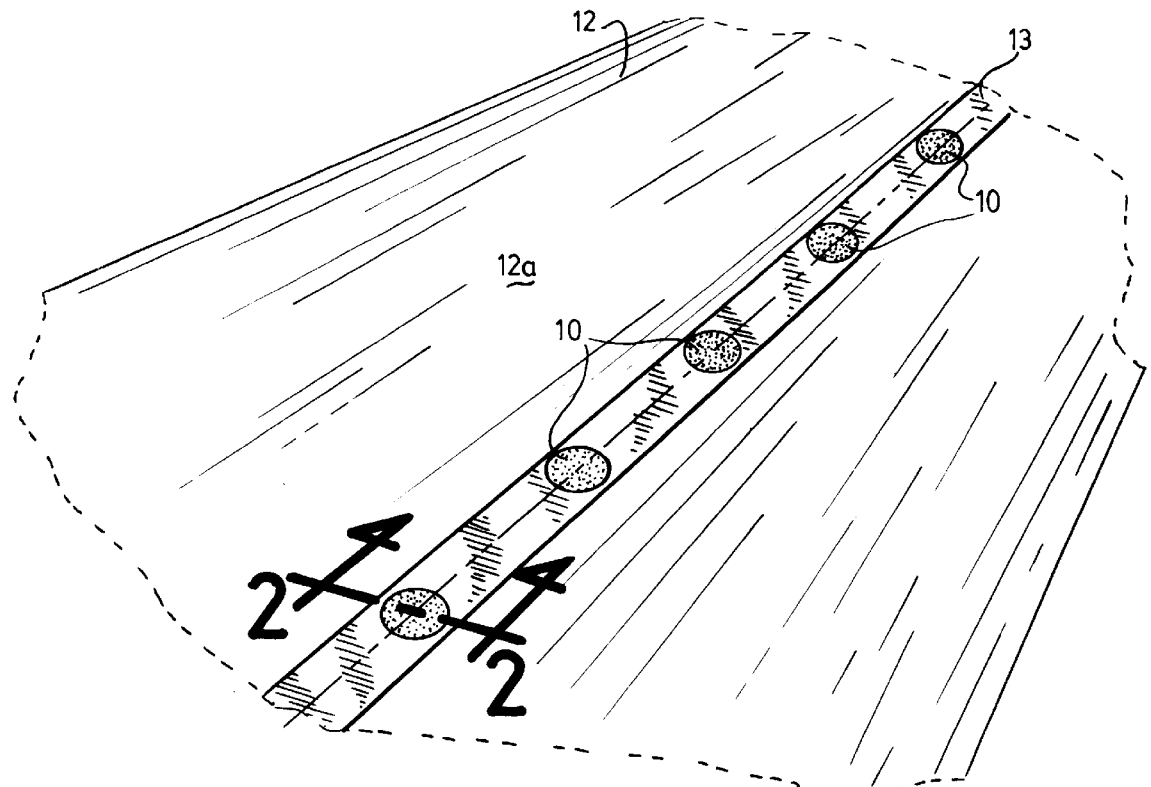
FIG. 1 is a top perspective view of a road section having several aligned surface light reflectors on a road centerline, according to a preferred embodiment of the invention.
Figure 2:
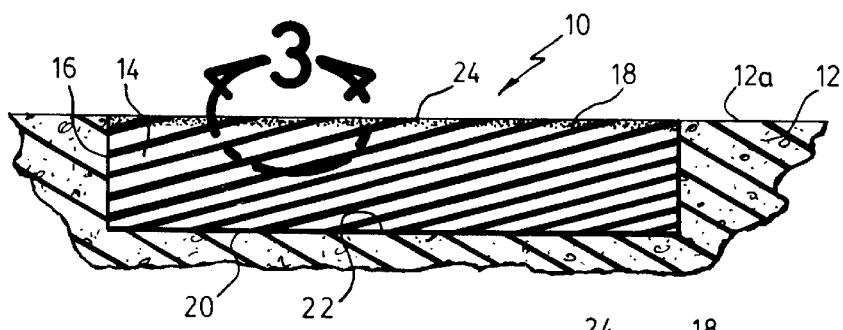
FIG. 2 is a cross-sectional view, at an enlarged scale, taken along line 2—2 of FIG. 1.
Figure 3:
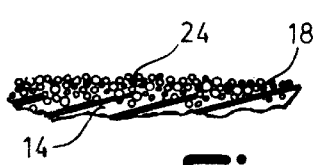
FIG. 3 is an enlarged view of the area circumscribed by line 3 of FIG. 2.

FIGS. 1 to 3 show a road surface light reflector 10 according to a preferred embodiment of the invention. A number of equally-spaced, aligned light reflectors 10 are destined to be installed on a conventional road 12 to act as position indicaters, as known in the art, e.g. to indicate the centerline 13 of a road 12 as in FIG. 1.

Reflector 10 comprises a main body 14 which is preferably of discoid shape, having a peripheral side wall 16, an upper surface 18 and a lower surface 20. Flat, cylindrical recesses 22 of complementary shape are made in road 12, in which main body 14 is inserted and embedded. Recess 22 is sized to snugly receive reflector 10, its main body upper surface 18 being approximately at the same level as the road 12 top surface 12a. As known in the art, attachment means are used to fixedly anchor the reflector 10 inside recess 22. The preferred attachment means is epoxy-based glue which is spread against the bottom surface 20 and peripheral side wall 16 of reflector main body 14, as disclosed for example in the above-mentioned Jefferies patent. Of course, the glue must be specifically designed for adhesive contact of the main body 14 with the road 12 concrete, and for withstanding harsh weather, important temperature differentials, salt, water and other elements found on roads and highways. Other alternate attachment means are also envisioned, such as small corrosion-resistant plates or rods that would be embedded in main body 14 and that would radially outwardly protrude from peripheral side wall 16 into the road 12 concrete.

As shown in FIGS. 2 and 3, main body 14 should be made of a polymeric material and has a granular reflective material 24 included therein at its upper portion, so that the granular material will be exposed at main body top surface 18.

Granular reflective material 24 is preferably crystalline, and preferably fragmented glass, although other suitable materials are envisioned, e.g. a suitably reflective fragmented plastic material, fragmented crystal, a suitably reflective fragmented mineral, or the like material. Of course, it can be seen that an important advantage of using fragmented glass is that it can be made from recycled glass bottles or other glass elements, thus reducing the production cost of the reflector according to the present invention.

The polymeric material used to produce the reflector main body 14 must have a low thermal expansion coefficient. What is meant by low thermal expansion coefficient, in this case, is that the thermal expansion of the reflector main body 14 must not alter significantly the attachment between it and the road recess 22, and it must not promote fissuring or otherwise physically, significant alteration of the adjacent road 12 concrete.

The preferred polymeric materials are rubber and plastic, which must be chosen to resist to weather variations, heavy loads from motor vehicles and elements such as calcium and other polluting agents. A preferred material is DURO 85® natural rubber.

Main body 14 is preferably about three quarters of an inch thick, and can have a diameter of about four inches, which coincides with the width of most road centerlines 13 in Canada. It is understood that the main body 14 dimensions can vary according to the situations in which it is needed. Also, it may advantageously be colored in a light and preferably fluorescent color, to enhance its reflective qualities and, most importantly, its visibility during daytime.

The fragmented glass preferably has a granularity which is inferior to 841 μm, and preferably the fragmented glass granularity is mostly (i.e. at least 50%) included in the 297 μm to 595 μm range, for best results combining reflectiveness and attachment to the rubber material.

With the reflector 10 as described above, there is provided a simple device which can be installed on roads 12 to indicate the centerline or sidelines of the road at low cost but with a high visibility in dark environments (at night or in closed areas). Indeed, the reflective granular material 24 as described herein, visible on the upper surface 18 of the reflector 10, has shown very unexpected and advantageous results in reflecting the light from incoming vehicles. Indeed, the glass material is crystalline, and therefore forms tiny flat surfaces all around its particles when fragmented. The beams of light are therefore likely to be reflected by a plurality of small flat surfaces which are oriented towards their source, thus acting as a plurality of small reflectors. Consequently, the fragmented glass 24 on top of main body 14 will act as a reflective surface substantially at a 360 degree angle around the reflector 10.

It can be seen that the reflector 10 according to the invention comprises important advantages over prior art devices:

1) it does not protrude beyond the road top surface 12a, and thus snow plows, road graders and other blade-equipped vehicles can scrape the road surface without the reflectors hindering the snow removal and, most importantly, without the road reflectors being damaged or removed by the vehicle blades; the latter will indeed slide over the reflector main body upper surface 18, which is substantially level with the road top surface 12a;

2) the reflector does not have an important production cost, since it is made of rubber and fragmented glass and has a very simple shape; and 3) the fragmented glass can advantageously replace the molded plastic surfaces as a reflective material, since it has similar flat reflective surfaces; however, the main advantage of the fragmented glass over the known plastic is that it can originate from recycled bottles and other glass elements without having to be molded or otherwise shaped in any particular fashion, other than crushed into its fragmented state.

A second preferred embodiment of the present invention (not shown) is very similar to the one shown in the annexed drawings. The only difference is that the glass particles are mixed with the rubber material throughout the entire main body 14, so as to simplify the production process. Of course, more glass particles are required to accomplish this embodiment.

In this second embodiment, preferably 20% to 35% of the main body 14 volume is occupied by the glass particles, for best results.

Whichever of the first or second embodiments are used, it is important that the upper section of the reflector main body 14 be not only covered with glass particles 24, but that they be included up to a minimal depth (at least a few millimeters) into main body 14, as seen in FIGS. 2 and 3. Indeed, the road scraping and the heavy traffic rolling over the reflectors may gradually wear the road and the reflector top surface layer, although only slightly. By providing glass particles 24 up to a certain depth into the main body 14, even if the latter is slightly worn at its top surface layer, its top surface remaining exposed will always show glass particles to reflect the vehicles headlights.

It is understood that although reference is made throughout this application to the use of the light reflector on a road surface, it can also advantageously be used on other surfaces, such as side wall surfaces or safety gates, e.g. on highway ramps or the like. Again, the main advantages of the reflector according to the invention is that its production cost is very low, and its design allows it not to protrude beyond the level of the surface on which it is installed, while still keeping its reflective qualities.

Of course, due to the low production cost of the reflector according to the invention, it can advantageously be used on conventional roads where no snow plowing is executed.

It is also understood that, although the reflector main body has been shown and described herein as having a discoid shape, it could be of many other different shapes, as long as it has a substantially flat upper surface and that a complementary receiving hole is formed thereunder in the concrete. For example, it could be square in top plan view.

I claim:

1. A road surface light reflector to be fixedly anchored into a complementary recess on the surface of a motorway road, said light reflector having a main body destined to be entirely and snugly embedded inside the road recess and defining an upper portion having a substantially flat top exposed surface destined to face upwardly so as to be apparent through the road recess and to be substantially at the same level as the road surface, said light reflector main body being made of a polymeric material having a low thermal expansion coefficient and having a granular, reflective material included into at least a top layer of said light reflector main body, wherein a small fraction of said reflective, granular material becomes exposed on said exposed top surface and thus a light reflective top surface is created to reflect the headlight beams of incoming vehicles on the road while said light reflector does not protrude above the road top surface.

2. A road surface light reflector as defined in claim 1, wherein said polymeric material is rubber.

3. A road surface light reflector as defined in claim 1, wherein said granular material is fragmented glass particles.

4. A road surface light reflector as defined in claim 3, wherein the granularity of said fragmented glass particles is inferior to 841 μm.

5. A road surface light reflector as defined in claim 4, wherein the granularity of said fragmented glass particles is mostly included in the 297 μm to 595 μm range.

6. A road surface light reflector as defined in claim 4, wherein said main body has a substantially discoid shape, thus further defining a cylindrical, peripheral side wall and a substantially flat lower surface.

7. A road surface light reflector as defined in claim 6, further comprising attachment means provided at least at one of said main body peripheral side wall and lower surface, for a fixed engagement in the road recess with the road material.

8. A road surface light reflector as defined in claim 7, wherein said attachment means is glue spread over said main body peripheral wall and lower surface for adhesive contact with the surrounding road material.

9. A road surface light reflector as defined in claim 6, wherein said main body has a diameter of approximately ten centimeters and a thickness of approximately two centimeters, said top layer of said main body containing said granular reflective material being approximately four millimeters thick.

10. A road surface light reflector as defined in claim 4, wherein said fragmented glass is mixed with said polymeric material throughout layers along the full depth of the entire reflector main body.

11. A road surface light reflector as defined in claim 11, wherein said fragmented glass occupies 20% to 35% of the reflector main body volume.

12. A road surface light reflector as defined in claim 1, wherein said granular material is mixed with said polymeric material throughout layers along the full depth of the entire reflector main body.

* * * * *